Figure 1:
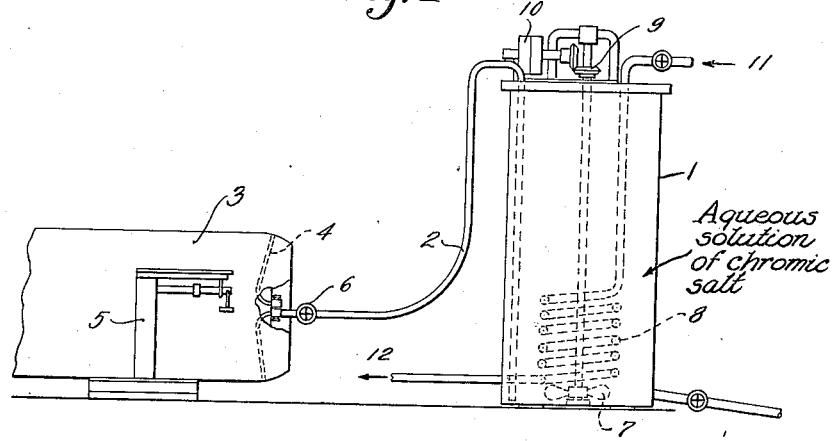

Dec. 11, 1934.  F. W. BINNS  1,983,733

METHOD OF MAKING CHROMIC SALT SOLUTIONS

Filed Nov. 14, 1932

Inventor,
Frederick W. Binns,
Attys.

UNITED STATES PATENT OFFICE 1,983,733

METHOD OF MAKING CHROMIC SALT SOLUTIONS

Frederick W. Binns, Quincy, Mass., assignor to Virginia Smelting Company, Portland, Maine, a corporation of Maine Application November 14, 1932, Serial No. 642,588

8 Claims. (Cl. 23—117)

This invention relates to a method for the preparation of chromic salt solutions and to the product thereby obtained.

In the preparation of chromic salt solutions, which are used for various purposes and in various industries, it is usually difficult to condition the chromium compound, and hence the qualifications and properties of the solution in which it is contained. For example, in the preparation of chromic salt solutions for use in tanning leather, a basic chromic salt is desired, but it is important that a certain degree of alkalinity shall not be exceeded, for if this occurs, the chromium is in part at least precipitated and consequently rendered ineffective for the purpose of tanning.

It is, therefore, an object of the invention to provide a method of preparing chromic salt solutions, such as basic chrome alum solutions intended for use in tanning leather, and to obtain solutions of this type in which the concentration and condition of the reagent materials may be predetermined. Other objects will appear from the following description.

The method of the invention generally includes the steps of treating an alkali dichromate, such as sodium or potassium dichromate, preferably in relatively dilute aqueous solution, by introducing into the same a stream of liquid sulphur dioxide, and causing the same to react upon the dichromate to substantial completion. Such reaction will be facilitated by the tendency of the liquid sulphur dioxide first to sink to the bottom of the dichromate solution on account of its greater specific gravity, and then to agitate the liquid and induce a thorough mixture of the whole by its subsequent volatilization. Such admixture is facilitated by introducing the liquid through a perforated pipe extending across the bottom of the container for the dichromate solution. It is preferably added in a single stream, however, and mixed by mechanical agitation of the whole, because it is found that such perforations may become clogged with the salt deposits, corrosion, etc.

The reaction which takes place between the dichromate and sulphur dioxide is exothermic. This tends to impart heat to the reaction mixture. On the other hand, the volatilization of the liquid sulphur dioxide to such extent as it occurs, absorbs heat and this in turn tends to cool the reactive mass. A large part of the liquid sulphur dioxide, however, no doubt reacts directly upon the dichromate component of the solution, and in this event the heat of vaporization is not involved, except that less heat of reaction is liberated than if gaseous sulphur dioxide were introduced.

The reaction may be stated as follows:

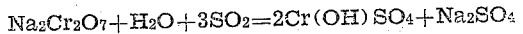

$$Na_2Cr_2O_7 + H_2O + 3SO_2 = 2Cr(OH)SO_4 + Na_2SO_4$$

The reaction, as a whole, results in an appreciable rise in temperature of the reaction mass.

Figure 2:
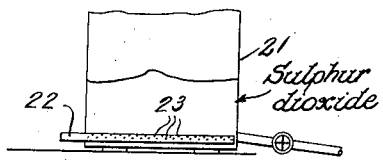

A typical instance of carrying out the invention will be described with respect to the preparation of a basic chrome alum solution suitable for use in the tanning of leather, reference being made to the accompanying drawing, in which:

Fig. 1 is a side elevation of apparatus in which the chemical reactions of the several reagents may be conveniently effected; and Fig. 2 illustrates a simple form of apparatus.

The tank 1, as shown in Fig. 1, may be in the shape of a vertical cylindrical drum into the bottom of which is led the pipe 2, of non-corrosive material, such as rubber hose, from a supply cylinder 3 adapted to contain the sulphur dioxide in liquid condition. This cylinder is preferably laid on its side or inverted so as to deliver the sulphur dioxide to the pipe 2 in liquid condition at all times, until it is empty. By having the outlet pipe 2 connect, inside the cylinder, with a bent tube 4 which may be turned downwardly, such supply of liquid may also be made certain even when the cylinder rests on its side, as shown. The cylinder is supported on a platform scale 5 so that its weight and differences in weight, upon withdrawing liquid $SO_2$ therefrom, may be ascertained, and hence the amount of sulphur dioxide used definitely regulated. The outlet from the cylinder 3 is controlled by a valve 6.

A solution of a soluble dichromate, such as sodium or potassium dichromate, is first introduced into the tank 1, which is open at the top. For example, a solution of sodium dichromate containing 1 or 2 lbs. to the gallon may be used conveniently and satisfactorily, though solutions of greater concentration are not precluded. The dichromate solution is placed in the tank first. The tank is preferably also provided with agitating paddles 7 and a cooling coil 8. These are both set in operation, as soon as the dichromate solution is added, the paddles being driven through gears 9 and pulley 10 from any suitable source of power (not shown) and the cooling coil being supplied with a cooling medium passing in through inlet 11 and out at educt pipe 12.

Liquid sulphur dioxide is next introduced into the tank through pipe 2 by opening the valve 6 and the required quantity, by weight, is introduced into the dichromate solution substantially exactly in accordance with the chemical equation given above. The reaction goes directly and substantially to completion as indicated without any appreciable loss of sulphur dioxide on the one hand, and without producing an excessively acidified solution, on the other.

Since it is customary in the subsequent tanning operation in which such solutions are commonly used to add alkalies to precipitate the chromium content, the amount of alkali subsequently required for this purpose is diminished by avoiding an excess of sulphur dioxide in the solution which would otherwise require to be neutralized.

As thus prepared, the solution is in condition to be run into the tanning vat and directly upon the hides, after simply diluting with water. The basic chromic sulphate content of such solution, though not completely in true solution, is carried into the hides in colloidal solution, and is preferably precipitated by treatment with alkalies, in the customary manner, which throws down a more basic chromic sulphate or chromic hydrate, directly upon and in the hide substance under treatment, which is particularly desirable in the tanning operation.

Another method of procedure may be followed with the apparatus indicated in Fig. 2 which is simpler than that of Fig. 1 but which may serve conveniently under some circumstances. In this apparatus, the liquid sulphur dioxide may be drawn from the supply cylinder 3 as before and led into an open tank 21 and introduced into the bottom of the dichromate solution through a pipe 22 having a plurality of perforations 23. In this way the heavy liquid sulphur dioxide is distributed throughout the bottom of the vessel. In this mode of operation, the dichromate solution may be somewhat more concentrated (e. g. 3 lbs. per gallon). In such apparatus also the sulphur dioxide may be relied upon to provide both the cooling and agitation of the reaction mixture. Thus, owing to the greater specific gravity of the liquid sulphur dioxide than of the dichromate solution, the former tends to settle by gravity. Upon contacting with the dichromate solution, however, (and being normally a gas at atmospheric temperature and pressure), it absorbs heat therefrom and tends, in part at least, to vaporize. The gaseous bubbles of sulphur dioxide gas thus produced rise through the dichromate solution and not only serve to react therewith and be dissolved into the solution, but also to agitate and mix the heavier liquid sulphur dioxide streams or globules with the dichromate solution. The heat liberated by the reaction warms up the solution and hastens the further progress of the reaction. But such heating also reduces the solubility of the sulphur dioxide gas so that a portion of it may escape. Hence, by this procedure, a somewhat greater amount of sulphur dioxide is required to insure complete reaction, with the result that control is less accurate and the final solution is more acidic than that produced by the former procedure. To check this tendency, a test of the acidity of the solution may be made and more sulphur dioxide added if needed or any excess of sulphur dioxide neutralized by the addition of caustic soda. Such addition of caustic soda, however, should be made after transferring the solution to another tank or after removing the perforated pipe since otherwise salts may be precipitated in the perforations, thus clogging them. The resulting solution is then ready for use as a tanning material or for other purposes as may be desired.

The basic chromic salt solution thus obtained is not only effective for use in the tanning of leather, but also, and in large quantities in the textile industry, as a mineral dye in the dyeing of cotton cloth to develop mineral colors, or in conjunction with iron salts to produce khaki shades, the mineral salts being precipitated and firmly fixed upon and in the fiber of the cloth.

I claim:

1. The process of preparing a basic chromic salt solution which comprises the step of introducing liquid sulphur dioxide into an aqueous solution of a chromic salt characterized by having a lower specific gravity than does liquid sulphur dioxide, and capable of reacting with the latter to form basic chromic sulphate.

2. The process of preparing a basic chromic salt solution which comprises the step of introducing liquid sulphur dioxide into an alkali chromate salt solution, and thereby producing in the solution basic chromic sulphate.

3. The process of preparing a basic chromic salt solution which comprises the step of introducing liquid sulphur dioxide into a solution of sodium dichromate.

4. The process of preparing a basic chromic salt solution which comprises the step of introducing liquid sulphur dioxide into a solution of potassium dichromate.

5. The process of preparing a basic chromic salt solution which comprises the step of introducing liquid sulphur dioxide into an aqueous solution of a chromic salt characterized by having a lower specific gravity than does liquid sulphur dioxide and capable of reacting with the latter to form basic chromic sulphate, with simultaneous agitation of the reaction mass.

6. The process of preparing a basic chromic salt solution which comprises the step of introducing liquid sulphur dioxide into an aqueous solution of a chromic salt characterized by having a lower specific gravity than does liquid sulphur dioxide and capable of reacting with the latter to form basic chromic sulphate, with simultaneous cooling of the reaction mass.

7. The process of preparing a basic chromic salt solution which comprises the step of introducing liquid sulphur dioxide into an aqueous solution of a chromic salt, characterized by having a lower specific gravity than does liquid sulphur dioxide, and capable of reacting with the latter to form basic chromic sulphate, with simultaneous agitation and cooling of the reaction mass.

8. The process of preparing a basic chromic salt solution which comprises the step of introducing liquid sulphur dioxide into an aqueous solution of a chromic salt, capable of reacting with sulphur dioxide to form basic chromic sulphate, with simultaneous agitation and cooling of the reaction mass, in substantially the exact molecular equivalents of one part of the chromium compound to three parts of sulphur dioxide, by weight.

FREDERICK W. BINNS.